United States Patent [19]

Malyon

[11] Patent Number: 4,636,868
[45] Date of Patent: Jan. 13, 1987

[54] COPIERS

[75] Inventor: Brian R. Malyon, Feltham, England

[73] Assignee: The British Library Board, London, England

[21] Appl. No.: 682,158

[22] Filed: Dec. 17, 1984

[30] Foreign Application Priority Data

Dec. 24, 1983 [GB] United Kingdom ............ 8334479

[51] Int. Cl.⁴ .............................................. H04N 1/04
[52] U.S. Cl. ................................ 358/285; 358/293; 358/294; 355/25; 355/75; 355/82
[58] Field of Search .................... 355/75, 25, 82, 84, 355/11, 3; 358/285, 293, 294, 256

[56] References Cited

U.S. PATENT DOCUMENTS

| | | | |
|---|---|---|---|
| 2,095,815 | 10/1937 | Hopkins | 355/025 |
| 3,195,430 | 7/1965 | Young | 355/025 |
| 3,712,729 | 1/1973 | O'Brien | 355/025 |
| 3,726,589 | 4/1973 | Difulvio et al. | 355/025 |
| 4,567,528 | 1/1986 | Wilman et al. | 358/294 |
| 4,574,316 | 3/1986 | Wilman et al. | 358/285 |
| 4,586,090 | 4/1986 | Wilman et al. | 358/294 |

Primary Examiner—James J. Groody
Assistant Examiner—Edward L. Coles
Attorney, Agent, or Firm—Gifford, Groh, VanOphem, Sheridan, Sprinkle & Dolgorukov

[57] ABSTRACT

Figure 2:
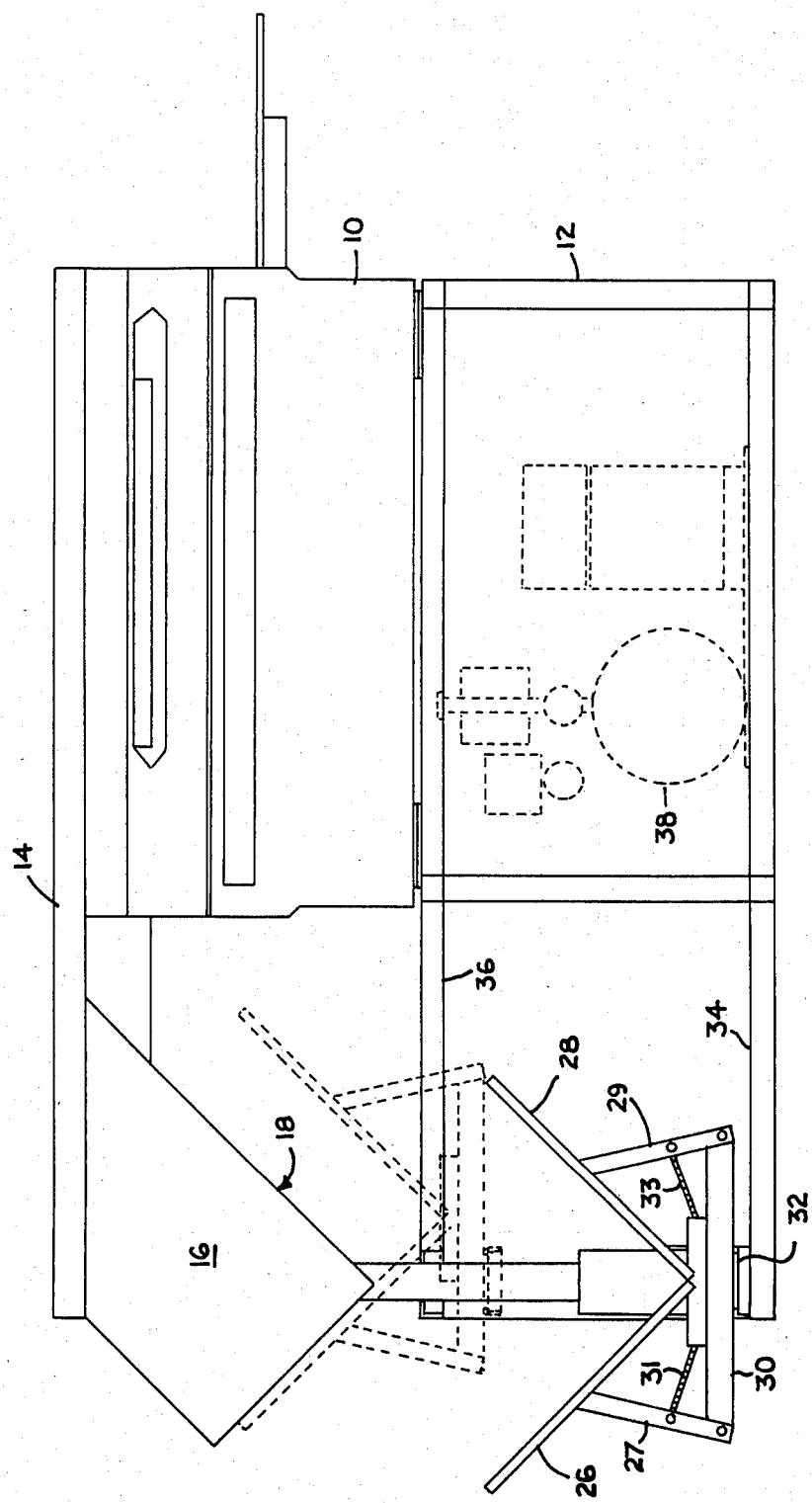

A document carrier, typically for supporting a book to be copied in a document copier by location of an opened page against an inclined window in a scanner housing, which carrier comprises a pair of separate plates (26, 28) supported in a trough-like configuration by arms (27, 29) which connect the backs of the plates to a movable platform (30), springs (31, 33) being provided, preferably to act between the platform and the supporting arms, to urge the plates into their said trough-like configuration (FIG. 2).

9 Claims, 2 Drawing Figures

COPIERS

DESCRIPTION

1. Field of Invention

This invention concerns document copiers such as scanning devices for converting a scanned page into electrical signals or photocopiers which reproduce in hard copy pages or documents presented to them.

2. Background to the Invention

In all such copying devices it is commonly required to copy the page of a bound volume such as a book and conventional copiers have included a flat surface onto which the document to be copied has to be placed and pushed down so as to present a flat surface to the scanning mechanism. In the case of a bound volume such as a book, this can result in the binding of the book becoming damaged particularly with regular copying from the same volume and to this end a document copier (photocopier) has been developed and has been described in our copending Patent Application entitled "Improvements in and relating to Copiers" No. 682,154 now U.S. Pat. No. 4,585,334, in which device an improved scanning head has been provided to allow a book or other bound volume to be presented in a half opened condition to the scanner so that the spine of the bound volume does not have to be opened fully and flattened.

The carrier for the bound volume in such devices is in the form of a 'V' shaped trough and the present invention is concerned with the provision of an improved form of trough for supporting bound volumes such as books for the presentation of such volumes to copiers or scanners as aforesaid.

SUMMARY OF THE INVENTION

According to the present invention a trough-like support for a bound volume such as a book to permit the latter to be presented to a scanner or viewing device of a copier configured in the form of a box-section housing having a window for viewing at least one of the open pages of the book, comprises:

1. A pair of separable plates normally mounted at approximately right angles and defining a trough,
2. a platform on which the two plates are mounted,
3. arms extending to the rear of the plates pivotally attached to the platform,
4. spring means acting on the said plates to urge the latter into the trough-like configuration.

The spring means may be attached to the plates at one end and the platform at the other or to the arms which are themselves attached to the plates at the one end and to the platform at the other end thereof.

The platform itself is preferably slideable relative to a supporting member laterally of the 'V' shaped housing containing the viewing aperture or window so that a volume opened so as to leave a relatively small thickness of pages on one side and a large thickness of pages on the other can be accommodated by lateral movement of the trough relative to the housing.

Where the volume contains a relatively thick binding the two plates can move apart so as to accommodate the same.

According to a further preferred feature of the invention, the plates may themselves be pivotally attached to the arms which are themselves pivotally attached to the platform so that the angle of plates can vary in the event that plates are urged apart by a thick book binding. The pivoting of the plates will thus allow the plates to conform to the faces of the housing containing the viewing window.

The platform is typically mounted on an arm which itself is carried by a housing movable both upwardly and downwardly relative to the 'V' shaped housing containing the viewing window so as to allow a book to be moved in an upward direction to engage the housing and allow a page of the book to be viewed through the window by the scanning mechanism.

Alternatively the platform may be fixed and the housing contained in the viewing window can be movable relative to the trough.

In a further alternative arrangement the trough and housing may be independently movable to allow either to be moved as required to bring the book into contact with the viewing window.

The invention also lies in a photocopier when fitted with a document carrier as aforesaid for presenting books and bound volumes and the like to a 'V' shaped housing containing a viewing window.

The invention also lies in a scanning apparatus for electrically scanning a page of a book to produce an electrical signal, typically in digital form, of the scanned information, when fitted with a document carrier as aforesaid.

Figure 1:
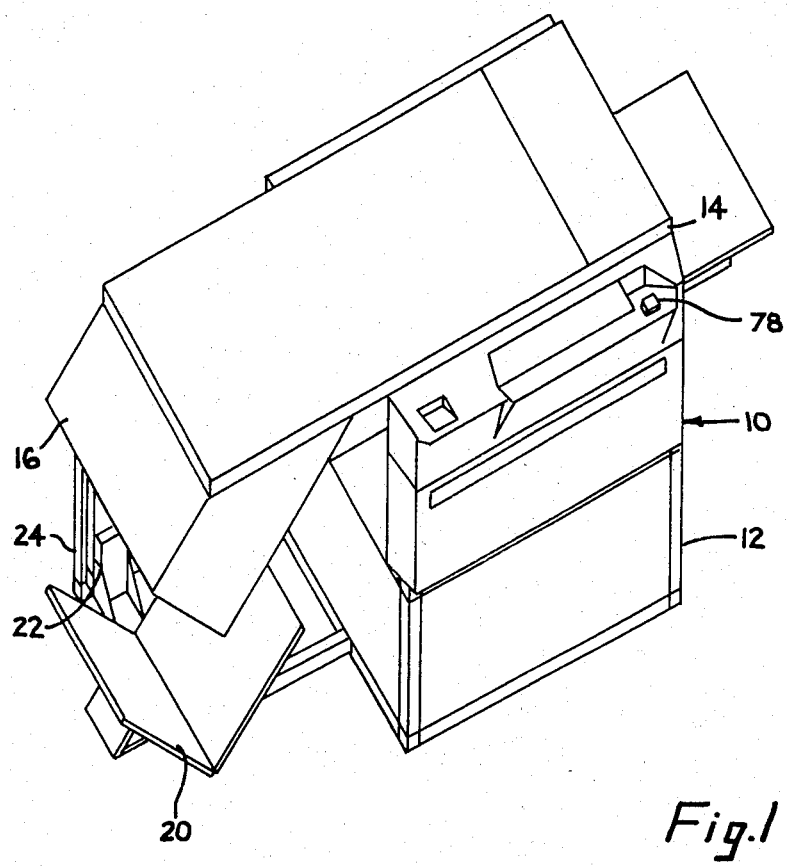

The invention will now be described by way of example with reference to the accompanying drawings in which:

FIG. 1 is a perspective view of a document copier fitted with a document carrier incorporating the invention, and FIG. 2 is a side view of the apparatus shown in FIG. 1.

Referring to FIG. 1, a conventional moving platen photocopier apparatus generally designated 10 is mounted on a stand 12 and in place of the moving platen there is secured thereto a housing 14 which overhangs the lefthand end of the unit 10 and includes as an integral unit depending therefrom a wedge-shaped housing 16 having a window therein on the face 18 (shown in FIG. 2) for viewing the page of a book or other bound volume located on a trough 20 situated under the wedge-shaped housing 16.

The trough 20 is supported by a slidable mounting 22 which is acted on by a double-acting pneumatic cylinder located within a leg 24 (the cylinder itself not being shown) and the trough 20 can be raised or lowered relative to the wedge-shaped housing 16 so as to allow a book located thereon to be offered up to the housing 16 for scanning or copying.

The wedge-shaped trough is such that the two side cheeks 26 and 28 (shown in FIG. 2) will displace laterally and relative the one to the other so that any shape or size of book can be accommodated thereon and will automatically center itself relative to the wedge-shaped housing 16 as the book is offered up to the wedge shape. This is best seen in FIG. 2 where in dotted outline the platform 30 on which the two inclined plates 26 and 28 are mounted is shown as having slid to the right of the supporting bracket 32 so that a book which has been opened at basically the first page can still be accommodated and centered relative to the wedge-shaped housing 16 so that the open face of the book can be seen through the window 18 and will be centered relative thereto.

Although the leg assembly 24 is shown being supported by two transversely extending struts 34 and 36, advantageously the leg may be supported wholly from the upper extension of the housing 14 and if necessary the upper end of the leg assembly 24 where it is secured to the housing 14 may be re-inforced to improve rigidity.

Below the unit 10 and within the space defined by the framework 12 is located a compressor generally designated 38 and other control apparatus. The compressor generates air at sufficient pressure to operate the air cylinder (not shown) for raising and lowering the platform 30 and trough 20.

Preferably a relief valve is provided so that as soon as the pressure in the system exceeds a given level the pressure is relieved. By careful selection of this pressure threshold, the maximum pressure between the book and the surfaces of the wedge-shaped housing 16 can be controlled so as to reduce the risk of any damage to a book occurring by excess pressure being applied.

The platform 30 may to advantage be rotatable relative to the strut 32 so that a book located on the trough 20 can be rotated to present a different page to the viewing window 18 without the need to touch the book.

Although the platform 30 is described as being movable relative to the strut 32 the plates 26 and 28 are also movable relative to each other. To this end they are attached to arms 27 and 29 which are at their lower ends pivoted to the platform 30. The arms are in turn attached to the platform through springs 31 and 33. The action of the springs 31 and 33 is to urge the two plates 26 and 28 together into the V configuration shown.

If desired, a window or viewing aperture may be provided in the housing 16 to allow a user to see the face of the document through the window 18 before it is copied. This will allow for accurate positioning of the document relative to the window 18 so that exactly the desired area of the document is either centered or actually in the field of view.

I claim:

1. A document carrier for a document copier, comprising a trough-shaped support adapted to support a work having plural edge connected pages (a book) and to present a page to an inclined window in a scanner housing, the carrier comprising:
   (1) a pair of separate plates normally positioned approximately at right angles and defining a trough;
   (2) a platform on which the two plates are mounted;
   (3) arms extending to the rear of the plates on the outside of the trough, said arms being, pivotally attached to the platform; and
   (4) spring means acting on the said plates to cause said arms to urge the plates towards the normal trough-shaped configuration.

2. A document carrier according to claim 1, wherein the spring means are attached between the arms and the platform.

3. A document carrier according to claim 1, wherein the platform is carried by a supporting member relative to which it is slidable laterally of the longitudinal direction of the trough.

4. A document carrier according to claim 1, wherein the plates are pivotally attached to the arms.

5. A document carrier according to claim 1, wherein the platform is carried by a support, and said support and the scanner housing are relatively movable for presentation of a book to the window.

6. A document carrier according to claim 5, wherein the support and the housing are independently movable.

7. A document carrier according to claim 1 comprising a scanning apparatus for electrically scanning information on a document to produce electrical signals therefrom.

8. A document carrier according to claim 1, wherein said carrier is equipped on an electrostatic photocopier.

9. In a document copier, a scanner housing having an inclined window and a support means for a book to locate a page thereof to be copied against the window, said support means comprising:
   (1) a V-support comprising two plates spring urged into a V-configuration;
   (2) a carrier member;
   (3) a platform carrying the V-support, said platform being movable relative to the carrier member longitudinally of the V-support;
   (4) means for moving the carrier member for presentation of an open book on the V-support to the scanner housing window.

* * * * *